(12) United States Patent
Berger

(10) Patent No.: US 7,886,917 B1
(45) Date of Patent: Feb. 15, 2011

(54) OBJECT STORAGE TRAY

(76) Inventor: Stuart Berger, 141 Halstead Ave., Mamaroneck, NY (US) 10543

( * ) Notice: Subject to any disclaimer, the term of this patent is extended or adjusted under 35 U.S.C. 154(b) by 460 days.

(21) Appl. No.: 12/011,295

(22) Filed: Jan. 25, 2008

(51) Int. Cl.
*A47G 29/00* (2006.01)
*A47G 19/08* (2006.01)

(52) U.S. Cl. ............... 211/85.31; 211/41.5; 211/133.5; 312/348.3

(58) Field of Classification Search ............... 211/41.1, 211/41.11, 41.2, 41.3, 41.4, 41.5, 41.8, 85.25, 211/85.31, 90.03, 126.7, 126.8, 133.5, 126.9, 211/175, 181.1, 184, 189, 208; 108/65, 102, 108/137; 312/348.3; D7/601; 99/449; 220/485, 220/486, 487, 488, 572
See application file for complete search history.

(56) References Cited

U.S. PATENT DOCUMENTS

| | | | | |
|---|---|---|---|---|
| 1,065,000 A * | 6/1913 | Sarter et al. | ............... | 211/41.11 |
| 1,528,744 A * | 3/1925 | Dix | ........................ | 211/41.11 |
| 2,066,374 A * | 1/1937 | Toulouse | .................... | 206/427 |
| 2,123,837 A * | 7/1938 | Thomas et al. | ........... | 211/85.31 |
| 2,239,482 A * | 4/1941 | Cocks | ........................... | 62/60 |
| 2,367,218 A * | 1/1945 | Joyce, Jr. | ....................... | 211/34 |
| 2,852,092 A * | 9/1958 | Fruth et al. | ..................... | 96/87 |
| 3,955,511 A * | 5/1976 | Bak | ............................ | 108/137 |
| 3,998,170 A * | 12/1976 | Gordon | ....................... | 108/91 |
| 4,178,844 A * | 12/1979 | Ward et al. | .................... | 99/449 |
| 4,254,881 A * | 3/1981 | Hard | ........................ | 211/85.29 |
| D297,489 S * | 9/1988 | Chap et al. | .................... | D7/601 |
| 5,249,823 A * | 10/1993 | McCoy et al. | ............... | 280/656 |
| 6,109,462 A * | 8/2000 | Emalfarb et al. | ............ | 211/119 |
| 6,491,173 B1 * | 12/2002 | Costa | .................... | 211/126.15 |
| 6,766,730 B2 * | 7/2004 | Wrenn | ........................ | 99/345 |
| 6,834,768 B2 * | 12/2004 | Jersey et al. | ................ | 211/189 |

* cited by examiner

*Primary Examiner*—Darnell M Jayne
*Assistant Examiner*—Joshua Rodden

(57) ABSTRACT

Object storage trays provide a tray for storing pots, pans, and their lids. First and second top members and first and second end members form a generally rectangular frame attached to a first center member, a first cross member, and a second cross member. Generally sinusoidal longitudinal members are attached to the first cross member, first center member, and second cross member. Glider brackets are attached beneath the longitudinal members to connect gliders to the object storage tray. Dividers mounted on sliding pivots are attached to the first center member and have lid handle notches in their middles. A telescoping embodiment of the invention is also disclosed that permits adjustments to the width of the object storage tray.

5 Claims, 8 Drawing Sheets

OBJECT STORAGE TRAY

BACKGROUND OF THE INVENTION

1. Field of the Invention

The present invention relates to an object storage tray for use in connection with object storage. The object storage tray has particular utility in connection with providing a tray for storing pots, pans, and their lids.

2. Description of the Prior Art

Object storage trays are desirable for providing a tray for storing pots, pans, and their lids. Many kitchens have cabinets filled with a chaotic assortment of pots, pans, and their lids. Typically, in order to maximize storage space, pots, pans, and their lids are stacked, resulting in nested pots. Such stacks are frequently unstable and tip over, and often the desired cooking utensil is underneath other objects, making it difficult to access. The pots, pans, and lids are also in physical contact with one another, leading to scratching and denting. The current invention overcomes these difficulties by storing pots, pans, and their lids on their sides with dividers physically separating each item from its neighbors.

The use of expandable racks for dishes and platters is known in the prior art. For example, U.S. Pat. No. D509,108 to Rosenberg et al. discloses an expandable rack for dishes and platters. However, the Rosenberg et al. '108 patent does not have pivoting and sliding dividers, and has further drawbacks of lacking a lid handle notch.

Japanese Patent Number JP01320007 to Eiji et al. discloses kitchen equipment that provides a storage cabinet. However, the Eiji et al. JP01320007 patent does not have pivoting and sliding dividers, and additionally does not have a lid handle notch.

Similarly, United States Patent Application Publication Number 2004/0095048 to Remmers discloses a pot and pan drawer system that provides convenient access to pots and pans and their lids in a residential or commercial kitchen. However, the Remmers 2004/0095048 patent application publication does not have dividers that pivot, and does not have dividers with an unattached edge.

In addition, United States Patent Application Publication Number 2006/0267467 to Harbison discloses a method and system for assisting in the storage and retrieval of objects that assists in the storage and retrieval of objects. However, the Harbison 2006/0267467 patent application publication does not have dividers that slide and pivot, and also does not have a lid handle notch.

Furthermore, U.S. Pat. No. 2,266,870 to Morgan discloses a cabinet with racks that is adapted to be placed in washing machines. However, the Morgan '870 patent does not have dividers that slide and pivot, and further lacks a lid handle notch.

U.S. Pat. No. 2,891,676 to Khan discloses a storage rack that stores dishes and cups. However, the Khan '676 patent does not have a divider that slides and pivots, and has the additional deficiency of lacking a lid handle notch.

In addition, U.S. Pat. No. 4,150,629 to Remmers discloses an organizer that stores assorted items. However, the Remmers '629 patent does not have dividers that slide and pivot, and also does not have a lid handle notch.

Furthermore, U.S. Pat. No. 4,627,672 to Morgan discloses a pull-out rack for a cabinet that organizes articles in a cabinet. However, the Morgan '672 patent does not have dividers that slide and pivot, and further lacks a lid handle notch.

U.S. Pat. No. 4,653,818 to DeBruyn discloses an apparatus for organizing storage containers in a cabinet that stores dry food products in a cabinet. However, the DeBruyn '818 patent does not have dividers that slide and pivot, and has the additional deficiency of lacking a lid handle notch.

Similarly, United States Patent Application Publication Number 5,086,936 to Remmers discloses a cabinet stacking basket organizer that maximizes usable storage space within a cabinet. However, the Remmers '936 patent application publication does not have dividers that pivot and slide, and does not have a lid handle notch.

In addition, U.S. Pat. No. 6,769,751 to Harbison discloses a cabinet storage shelf that stores utensils. However, the Harbison '751 patent application publication does not have dividers that pivot and slide, and also does not have a lid handle notch.

Furthermore, U.S. Pat. No. 7,104,409 to Morgan discloses an adjustable storage rack for pots, pans and lids that stores pots, pans, skillets and lids. However, the Morgan '409 patent does not have dividers that slide and pivot, and further lacks a lid handle notch.

U.S. Pat. No. 6,209,978 to Khan discloses a waste organizing cabinet that stores recyclable materials. However, the Khan '978 patent does not have a divider that slides and pivots, and has the additional deficiency of lacking a lid handle notch.

In addition, U.S. Pat. No. 6,467,860 to Remmers discloses a drawer glide system that is a sliding drawer system. However, the Remmers '860 patent does not have dividers that slide and pivot, and also does not have a lid handle notch.

Lastly, U.S. Pat. No. D471,768 to Morgan discloses a nesting storage rack for pots, pans and lids that is an ornamental design for a nesting storage rack for pots, pans and lids. However, the Morgan '768 patent does not have dividers that slide and pivot, and further lacks a lid handle notch.

While the above-described devices fulfill their respective, particular objectives and requirements, the aforementioned patents do not describe an object storage tray that allows for providing a tray for storing pots, pans, and their lids. The above patents make no provision for dividers that slide and pivot or a lid handle notch.

Therefore, a need exists for a new and improved object storage tray that can be used for providing a tray for storing pots, pans, and their lids. In this regard, the present invention substantially fulfills this need. In this respect, the object storage tray according to the present invention substantially departs from the conventional concepts and designs of the prior art, and in doing so provides an apparatus primarily developed for the purpose of providing a tray for storing pots, pans, and their lids.

SUMMARY OF THE INVENTION

In view of the foregoing disadvantages inherent in the known types of expandable racks for dishes and platters now present in the prior art, the present invention provides an improved object storage tray, and overcomes the above-mentioned disadvantages and drawbacks of the prior art. As such, the general purpose of the present invention, which will be described subsequently in greater detail, is to provide a new and improved object storage tray which has all the advantages of the prior art mentioned heretofore and many novel features that result in a object storage tray which is not anticipated, rendered obvious, suggested, or even implied by the prior art, either alone or in any combination thereof.

To attain this, the present invention essentially comprises a first top member with its opposing ends connected to the opposing ends of second top member by the opposing ends of a first end member, a first cross member, a second end member, and a second cross member. A longitudinal member is attached at its opposing ends to the first cross member and the second cross member. The longitudinal member is generally sinusoidal in shape with peaks and troughs.

In an alternative embodiment, the present invention essentially comprises a first top member with a first end member attached at one end, a second end member attached to its opposing end, and a first and second center member attached to its middle. A second top member has its middle attached to the first center member opposite the first top member. A first telescoping sleeve has one end attached to the first end member and its opposing end attached to a fifth end member. A second telescoping sleeve has one end attached to the second center member and its opposing end attached to a third center member. A third telescoping sleeve has one end attached to the second end member and its opposing end attached to a sixth end member. A third top member has one of its opposing ends attached to the fifth end member and one of its opposing ends attached to the sixth end member opposite the fifth end member. A first cross member has opposing ends connecting the first top member and the second top member to one another. A second cross member has opposing ends connecting the first top member and the second top member to one another. A third end member has opposing ends with one end attached to the third top member. A fourth end member has opposing ends with one end attached to the third top member. A longitudinal member has its opposing ends attached to the first cross member and the second cross member, respectively, and its middle attached to the first center member. A longitudinal member has opposing ends and a middle with its opposing ends attached to the third end member and the fourth end member, respectively.

There has thus been outlined, rather broadly, the more important features of the invention in order that the detailed description thereof that follows may be better understood and in order that the present contribution to the art may be better appreciated.

The invention may also include a first center member with its opposing ends connected to the middle of the first top member and the middle of the second top member. The middle of longitudinal member may be attached to the first center member. There may be a plurality of glider brackets attached to the longitudinal member. There may be a plurality of gliders attached to the glider brackets' opposing ends. There may be a plurality of screws threadedly connecting the glider brackets to the gliders. The longitudinal member may be generally sinusoidal in shape having peaks and troughs. The longitudinal member may come to a peak at its opposing ends and its middle with a trough in between its middle and each of its opposing ends. The object storage tray may be made from rubber coated wire. There may be a plurality of longitudinal members. There may be a sliding pivot removably, slidably and pivotably mounted on the first center member. There may be a divider with one of its opposing ends connected to the sliding pivot. There may be a notch defined by the sliding pivoted that receives the first center member. The middle of the divider may define a lid handle notch. The middle of the divider may define two lid handle notches, thereby giving the divider a generally FIG. 8 shape. There may be a plurality of glider brackets attached to the longitudinal member attached to the first cross member and the second cross member. There may be a first sleeve support connecting the first telescoping sleeve to the first cross member. There may be a second sleeve support connecting the third telescoping sleeve to the second cross member. There may be a plurality of support members extending perpendicularly from the longitudinal members. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved object storage tray that has all of the advantages of the prior art expandable racks for dishes and platters and none of the disadvantages.

It is another object of the present invention to provide a new and improved object storage tray that may be easily and efficiently manufactured and marketed.

An even further object of the present invention is to provide a new and improved object storage tray that has a low cost of manufacture with regard to both materials and labor, and which accordingly is then susceptible to low prices of sale to the consuming public, thereby making such object storage tray economically available to the buying public.

Still another object of the present invention is to provide a new object storage tray that provides in the apparatuses and methods of the prior art some of the advantages thereof, while simultaneously overcoming some of the disadvantages normally associated therewith.

Even still another object of the present invention is to provide an object storage tray for providing a tray for storing pots, pans, and their lids. This allows the user to store pots, pans, and lids of varying sizes.

Still yet another object of the present invention is to provide an object storage tray for providing a tray for storing pots, pans, and their lids. This makes it possible to separate pots, pans, and lids from one another within the object storage tray.

An additional object of the present invention is to provide an object storage tray for providing a tray for storing pots, pans, and their lids. This enables the object storage tray to be slid in and out of a cabinet.

A further object of the present invention is to provide an object storage tray for providing a tray for storing pots, pans, and their lids. This prevents pots, pans, and their lids stored in the object storage tray from being scratched or dented by the object storage tray or each other.

Lastly, it is an object of the present invention to provide a new and improved object storage tray for providing a tray for storing pots, pans, and their lids.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
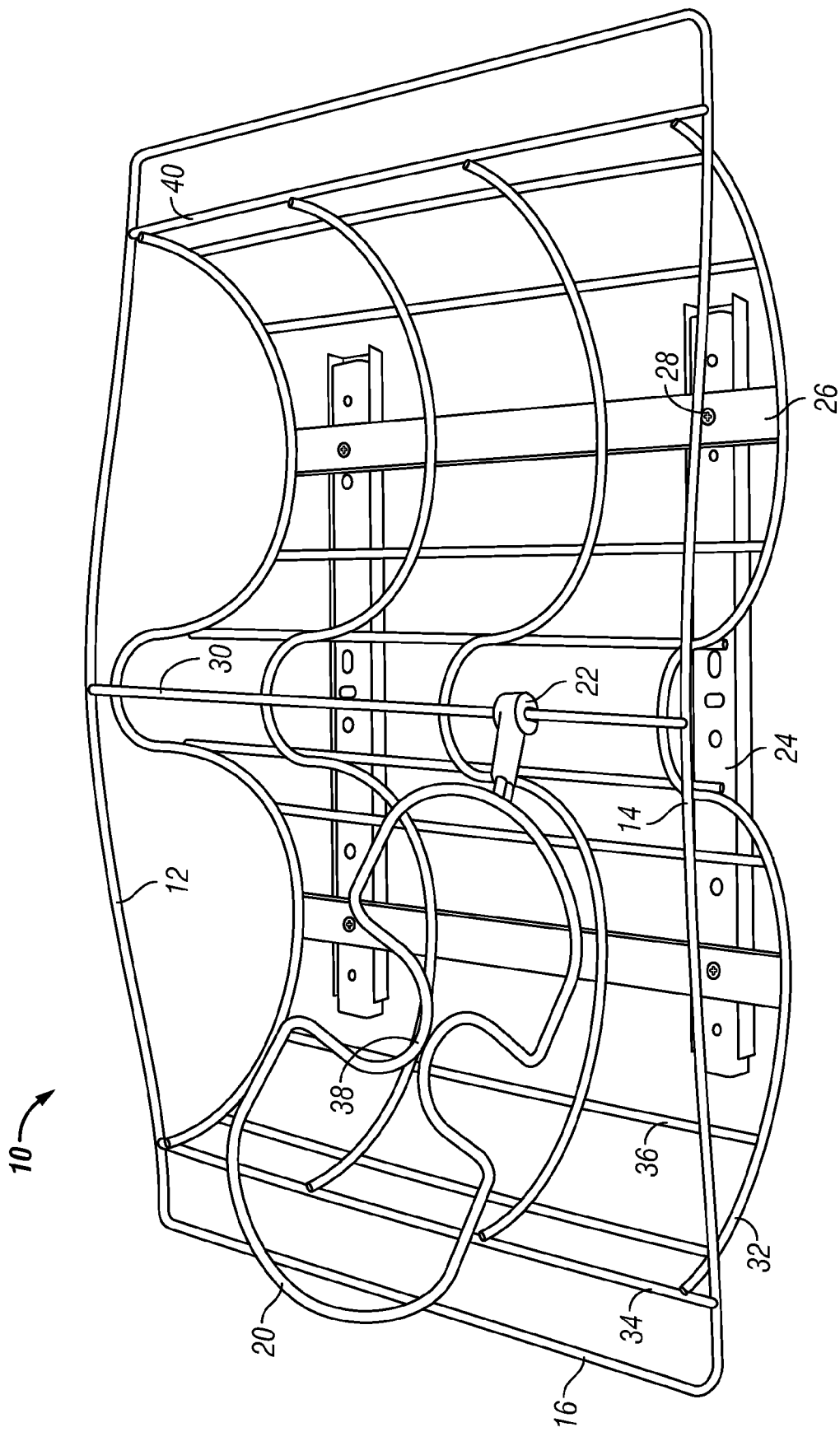
FIG. 1 is a top perspective view of the current embodiment of the object storage tray constructed in accordance with the principles of the present invention.

Referring now to the drawings, and particularly to FIGS. 1-5, a current embodiment of the object storage tray of the present invention is shown and generally designated by the reference numeral 10.

In FIG. 1, a new and improved object storage tray 10 of the present invention for providing a tray for storing pots, pans, and their lids is illustrated and will be described. More particularly, the object storage tray 10 has a first top member 12 with its opposing ends connected to the opposing ends of second top member 14 by the opposing ends of first end member 16, first cross member 34, second end member 18, and second cross member 40. The middles of the first top member 12 and second top member 14 are joined by the opposing ends of first center member 30. Four longitudinal members 32 have their opposing ends joined to first cross member 34 and second cross member 40, respectively. The middle of longitudinal members 32 is attached to first center member 30. The longitudinal members 32 are generally sinusoidal in shape with peaks attached to the first cross member 34, first center member 30, and second cross member 40. The troughs of longitudinal members 32 are attached to glider brackets 26. The opposing ends of glider brackets 26 are attached by screws 28 to gliders 24. Gliders 24 can be attached to the interior of a cabinet so that the object storage tray 10 can be slid in and out of the cabinet. A divider 20 is attached at one end to first center member 30 by sliding pivot 22. Sliding pivot 22 is free to pivot about first center member 30 and can be slid between adjacent longitudinal members 32 on first center member 30. Sliding pivot 22 can also be disconnected from first center member 30 and reattached to first center member 30 in a different location. The middle of divider 20 forms lid handle notches 38, making divider 20 generally FIG. 8 shaped. Divider 20 separates pots, pans, and lids from one another. The lid handle notches 38 receive the handles of lids when they are stored in the object storage tray 10. Eight support members 36 connect the longitudinal members 32 to one another. In the current embodiment, the object storage tray 10 is made of rubber coated wire.

Figure 2:
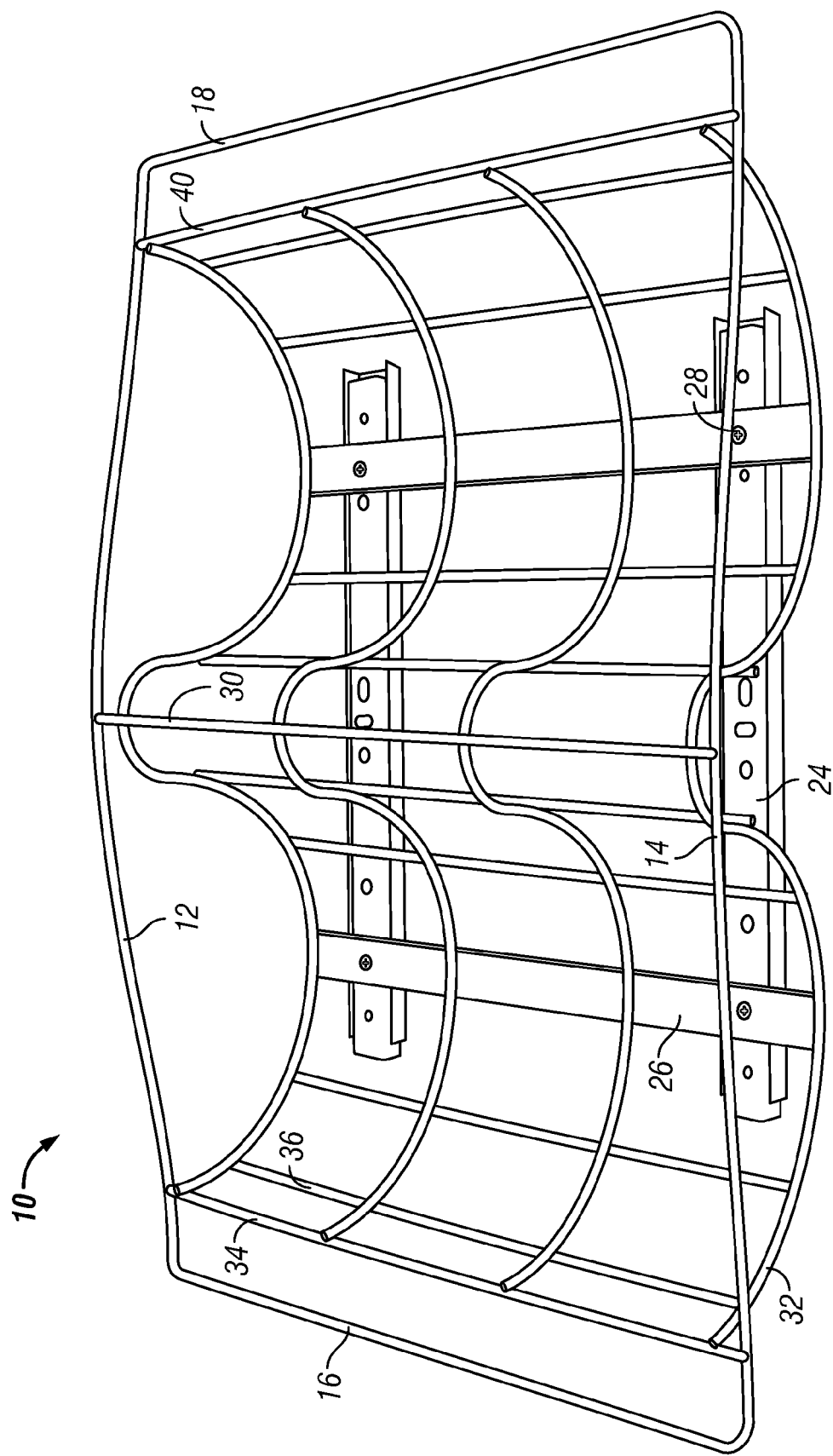
FIG. 2 is a top perspective view of the object storage tray of the present invention.

Moving on to FIG. 2, a new and improved object storage tray 10 of the present invention for providing a tray for storing pots, pans, and their lids is illustrated and will be described. More particularly, the object storage tray 10 is depicted with divider 20 removed. Longitudinal members 32 are generally sinusoidal in shape to receive pots, pans, and their lids. Support members 36 strengthen the object storage tray 10 and prevent smaller pots, pans, and their lids from falling through the bottom of object storage tray 10. First end member 16 and second end member 18 can be used as handles to lift, pull, or push the object storage tray 10. When gliders 24 are attached to a surface, pulling or pushing on first end member 16 and/or second end member 18 causes the object storage tray 10 to slide on gliders 24.

Figure 3:
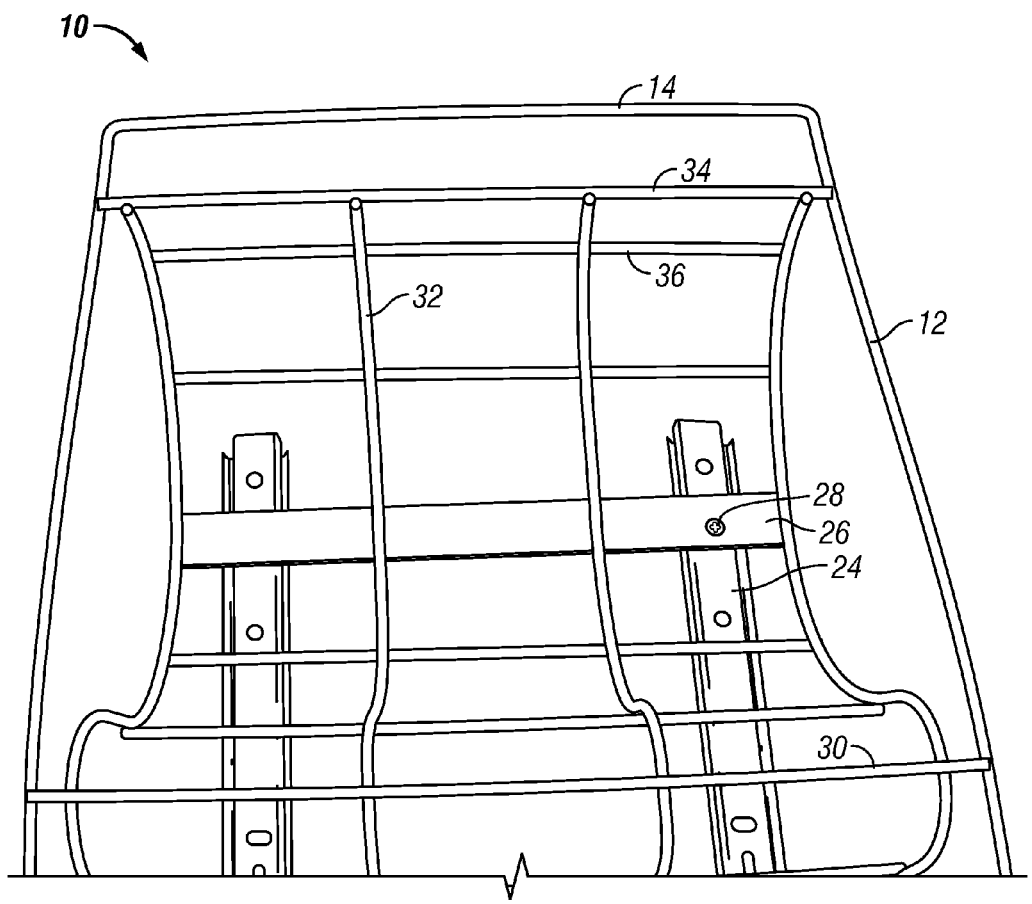
FIG. 3 is a top perspective fragmentary view of the object storage tray of the present invention.

Continuing with FIG. 3, a new and improved object storage tray 10 of the present invention for providing a tray for storing pots, pans, and their lids is illustrated and will be described. More particularly, the object storage tray 10 has a first end member 14 joining one end of first top member 12 to one end of second top member 14. First center member 30 joins the middles of first top member 12 and second top member 14. Pots, pans, and their lids are placed in the object storage tray 10 by laying them on their sides in the troughs of the longitudinal members 32.

Figure 4:
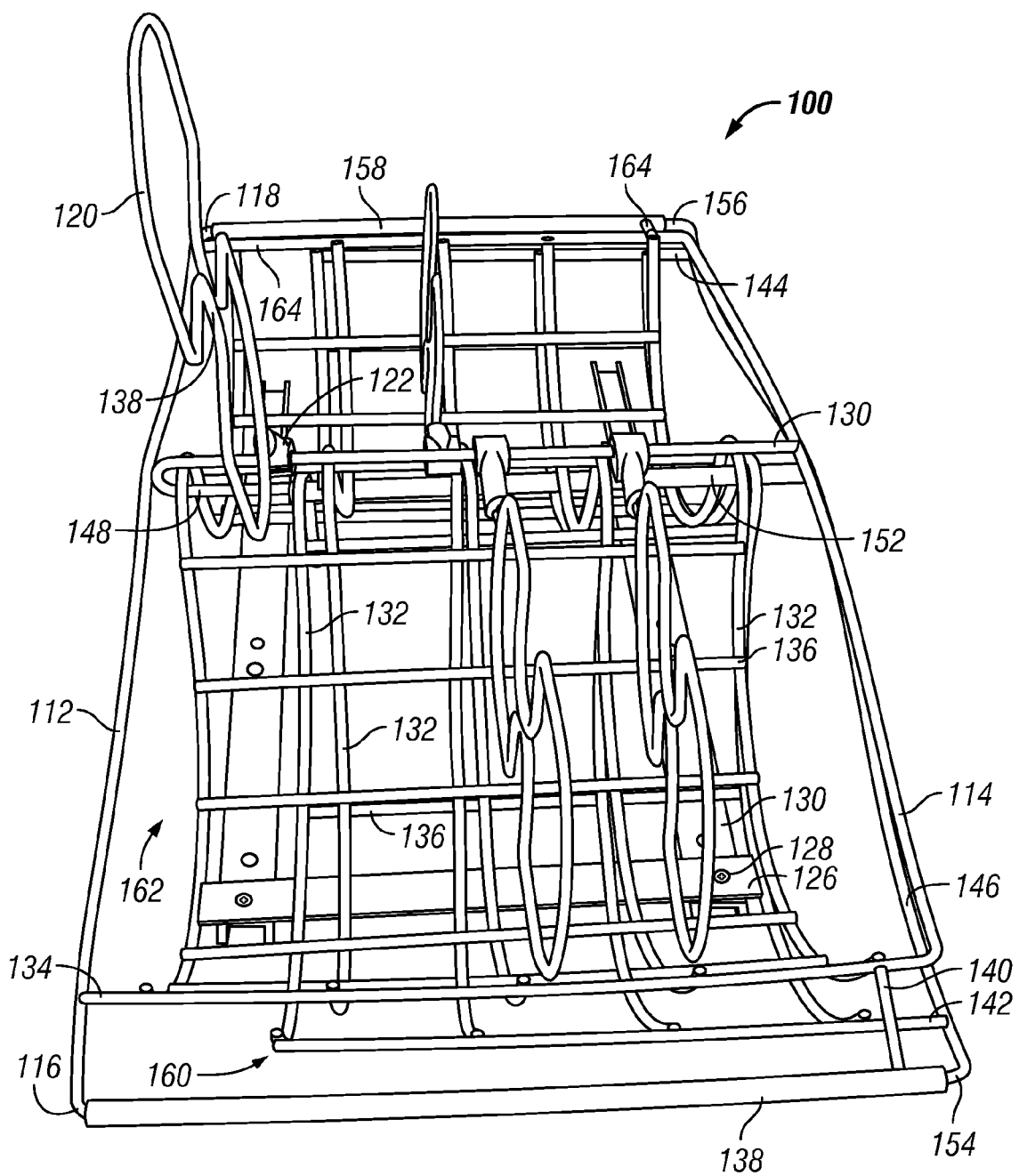
FIG. 4 is a top perspective view of the object storage tray of the present invention.

In FIG. 4, a new and improved object storage tray 100 of the present invention for providing a tray for storing pots, pans, and their lids is illustrated and will be described. More particularly, the object storage tray 100 is an alternative embodiment of the invention featuring an additional tray portion that nests with and is telescopically attached to the primary tray portion. A first telescoping sleeve 138 connects first end member 116 with fifth end member 154. A second telescoping sleeve 152 connects second center member 148 with third top member 146. A third telescoping sleeve 158 connects second end member 118 with sixth end member 156. First cross member 134 has its opposing ends attached to first top member 112 and second top member 114, respectively. Third end member 142 has one of its opposing ends connected to third top member 146. Fifth end member 154 is attached to one end of third top member 146. The opposing end of third top member 146 is attached to sixth end member 156. Longitudinal members 132 connect first cross member 134 to second cross member 164 and first center member 130 in the non-telescoping portion 162. Additional longitudinal members 132 connect third end member 142 and fourth end member 144 in the telescoping portion 160. Two glider brackets 126 are connected to the longitudinal members 132 that are part of the non-telescoping portion 162. Screws 128 connect glider brackets 126 to gliders 130. Support members 136 connect the longitudinal members 132 of the non-telescoping portion 162 to one another. Additional support members 136 connect the longitudinal members 132 of the telescoping portion 160 to one another. A first sleeve support 140 connects the first cross member 134 to first telescoping sleeve 138. A second sleeve support 164 connects the second cross member 164 to the third telescoping sleeve 158. The object storage tray 100 is depicted with one of the dividers 120 with lid handle notch 138 in its center pivoted about first center member 130 on sliding pivot 122 into a raised position. In the current embodiment, first center member 130 and second center member 148 are formed by a single piece of rubber coated wire that is bent in a U-shape.

Figure 5:
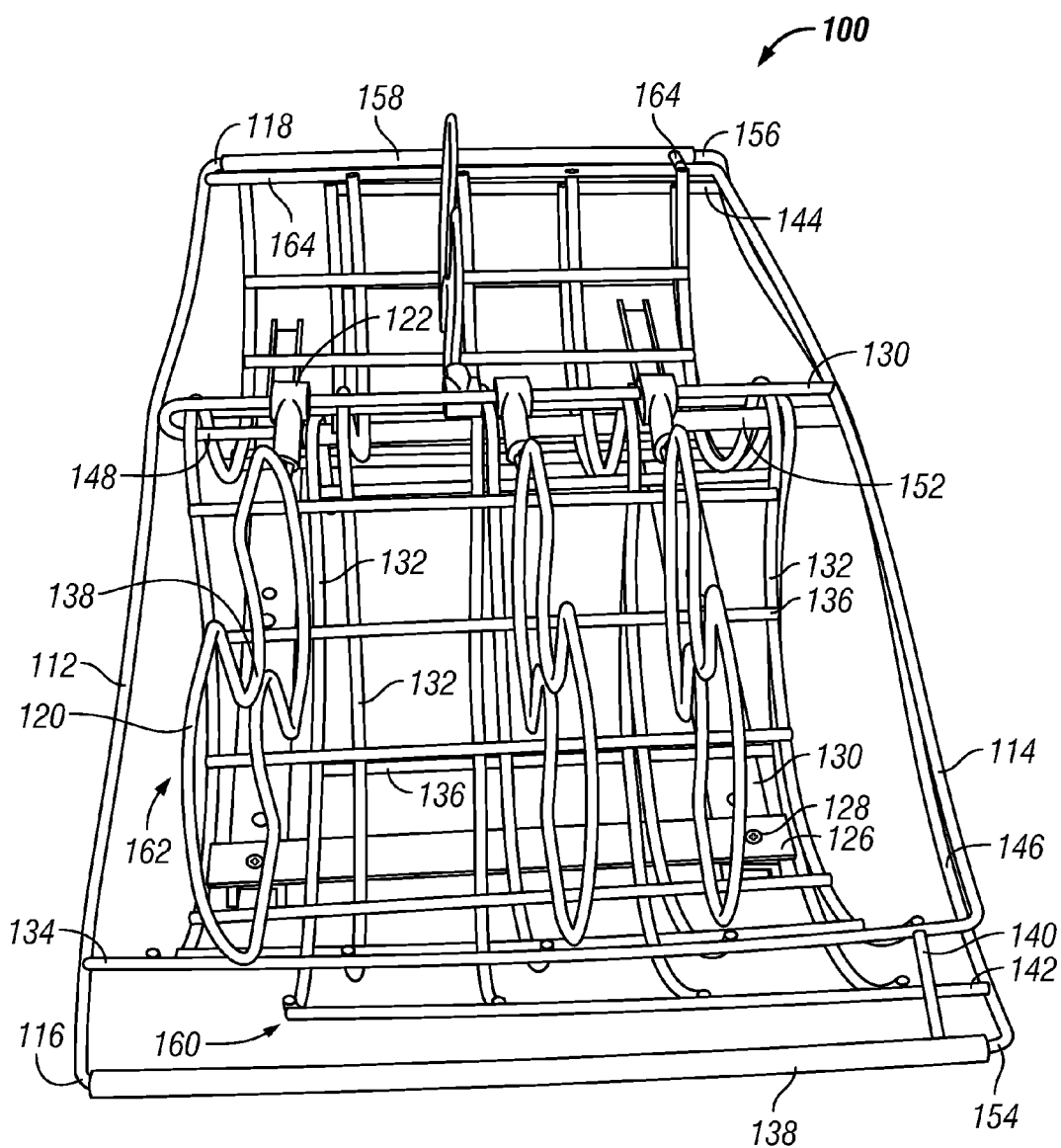
FIG. 5 is a top perspective view of the object storage tray of the present invention.

Continuing with FIG. 5, a new and improved object storage tray 100 of the present invention for providing a tray for storing pots, pans, and their lids is illustrated and will be described. More particularly, the object storage tray 100 is depicted with all of its dividers 120 in a lowered position. All the longitudinal members 132 are generally sinusoidal in shape. Support members 136 and extend perpendicularly from the longitudinal members 132.

Figure 6:
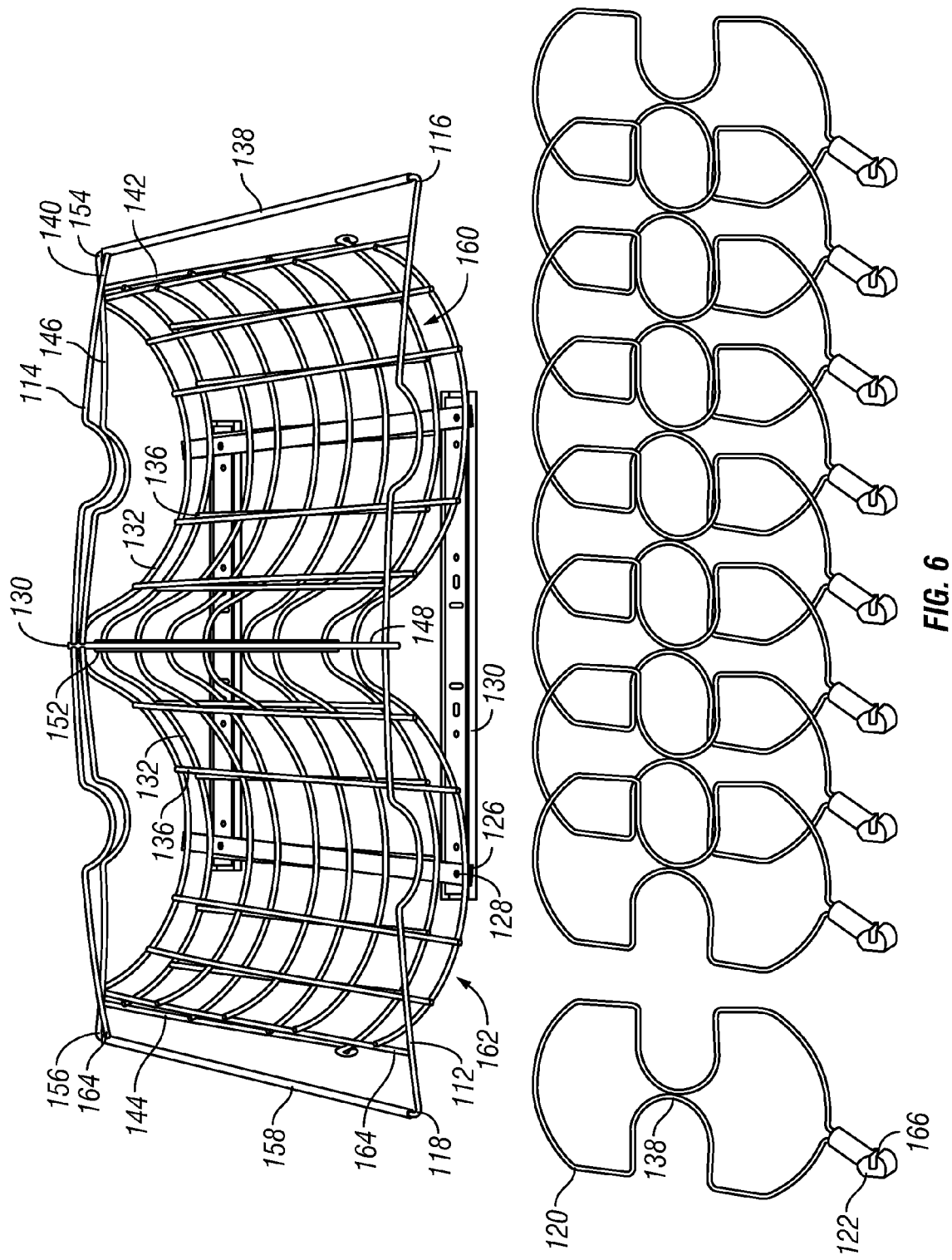
FIG. 6 is a top perspective view of the object storage tray of the present invention.

In FIG. 6, a new and improved object storage tray 100 of the present invention for providing a tray for storing pots, pans, and their lids is illustrated and will be described. More particularly, the object storage tray 100 is depicted with its dividers 120 removed. This enables the user to vary the quantity of dividers 120 to accommodate a range of pot and pan sizes and quantities. This is accomplished by a notch in the sliding pivots 122 that receives the first center member and/or the third end member 142 and fourth end member 144. The sliding pivots 122 extend at an angle from dividers 120 and are attached above the center axis of dividers 120. This arrangement, along with the generally FIG. 8 shape of the dividers 120, permits the bottom edge of the dividers 120 to sit flush against longitudinal members 132 and support members 136. As a result, stored pots and pans cannot tilt forward underneath dividers 120.

Figure 7:
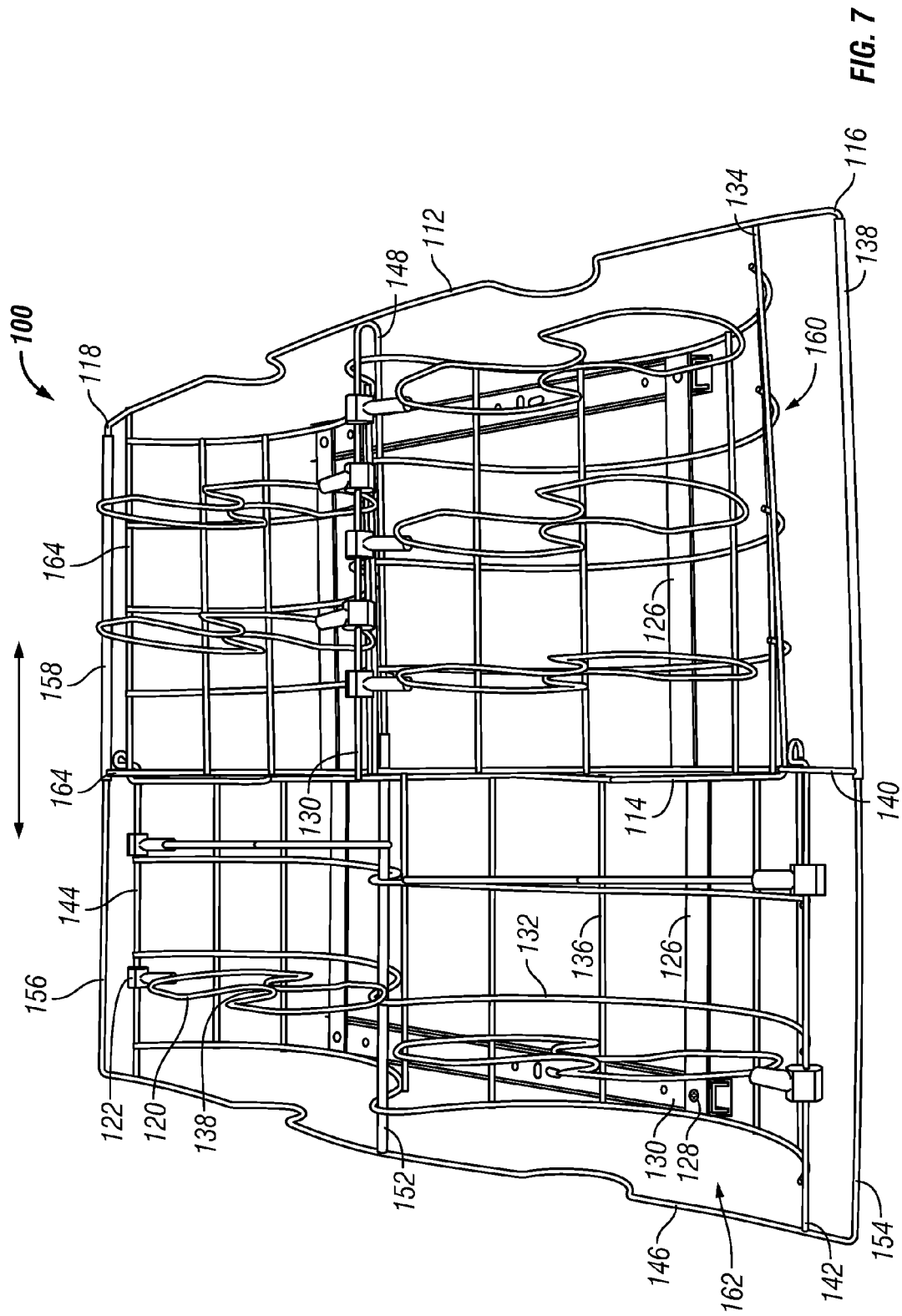
FIG. 7 is a top perspective view of the object storage tray of the present invention.

Continuing with FIG. 7, a new and improved object storage tray 100 of the present invention for providing a tray for storing pots, pans, and their lids is illustrated and will be described. More particularly, the telescoping action of the object storage tray 100 is depicted. The object storage tray 100 has been widened through telescoping compared with the position depicted in FIG. 4. This enables the user to vary the width of the object storage tray 100 to fit a variety of cabinets. In the current embodiment, the object storage tray 100 is has an adjustable width varying from 10 to 20 inches.

Figure 8:
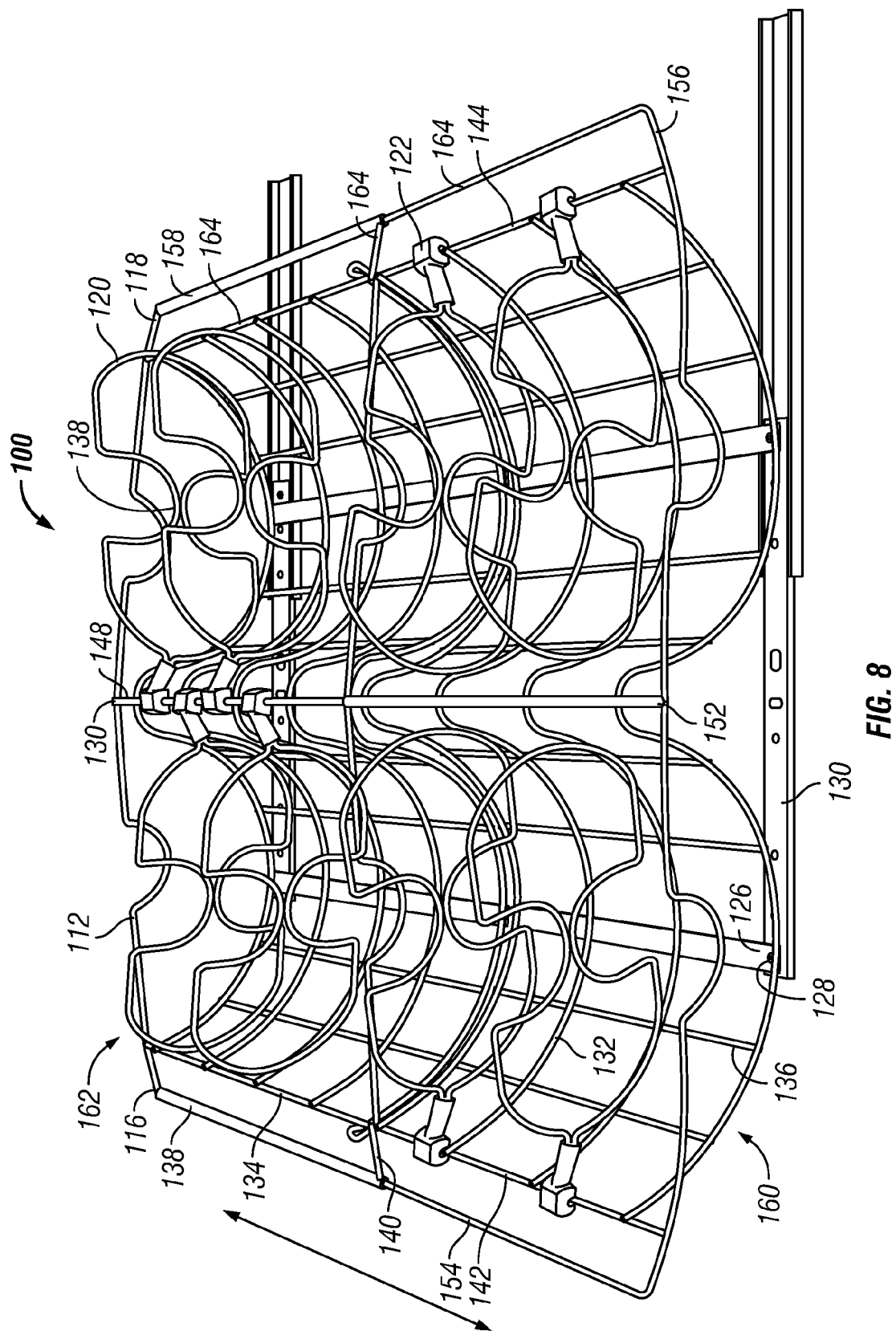
FIG. 8 is a top perspective view of the object storage tray of the present invention.

Concluding with FIG. 8, a new and improved object storage tray 100 of the present invention for providing a tray for storing pots, pans, and their lids is illustrated and will be described. More particularly, the gliding action of the object storage tray 100 is depicted. The object storage tray 100 has been slid forward by extending glider 130. This enables the user to slide the object storage tray 100 in and out of a cabinet to which gliders 130 have been attached.

In use, it can now be understood that the user selects an embodiment of the object storage tray. If the telescoping embodiment is selected, the user pulls or pushes on the third top member to adjust the width of the object storage tray. The user can optionally install the gliders inside of a cabinet so that the object storage tray can be slid in and out of the cabinet easily. To store pots and pans, the user turns them on their sides, adjusts the position of the dividers to accommodate the pots and pans, and places the pots and pans in the troughs of the longitudinal members while using the dividers to separate them. Lids are also placed in the troughs of longitudinal members on their sides, and the dividers are adjusted so that the lid handle notches receive the lid handles.

While a current embodiment of the object storage tray has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or plastic coated wire may be used instead of the rubber coated wire described. And although providing a tray for storing pots, pans, and their lids has been described, it should be appreciated that the object storage tray herein described is also suitable for storing a wide variety of objects. Furthermore, a bolt, a weld, a rivet, or any other type of fastening method could be used instead of the screw described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An object storage tray comprising:
    a first top member having opposing ends and a middle;
    a first end member attached to one of said opposing ends of said first top member;
    a second end member attached to one of said opposing ends of said first top member opposite said first end member;
    a first center member having opposing ends with one end attached to said middle of said first top member;
    a second center member having opposing ends with one end attached to said middle of said first top member;
    a second top member having opposing ends and a middle, wherein said middle of said second top member is attached to one of said opposing ends of said first center member opposite said first top member;
    a first telescoping sleeve having opposing ends with one end attached to said first end member and said opposing end telescopically attached to a fifth end member,
    a second telescoping sleeve having opposing ends with one end telescopically attached to said second center member and said opposing end attached to a third top member;
    a third telescoping sleeve having opposing ends with one end attached to said second end member and said opposing end telescopically attached to a sixth end member;
    said third top member having opposing ends with one of said opposing ends attached to said fifth end member and one of said opposing ends attached to said sixth end member opposite said fifth end member;
    a first cross member having opposing ends connecting said first top member and said second top member to one another;
    a second cross member having opposing ends connecting said first top member and said second top member to one another;
    a third end member having opposing ends with one end attached to said third top member;
    a fourth end member having opposing ends with one end attached to said third top member;
    a longitudinal member having opposing ends and a middle with said opposing ends attached to said first cross member and said second cross member, respectively, and said middle attached to said first center member;
    an additional longitudinal member having opposing ends and a middle with said opposing ends attached to said third end member and said fourth end member, respectively.

2. The object storage tray as defined in claim 1, further comprising:

a plurality of glider brackets, wherein said glider brackets are attached to said longitudinal member attached to said first cross member and said second cross member, and a glider attached to said glider brackets.

3. The object storage tray as defined in claim 1, further comprising:

a sliding pivot slidably and pivotably mounted on said first center member, and a divider having opposing ends and a middle with one of said opposing ends connected to said sliding pivot.

4. The object storage tray as defined in claim 3, further comprising a lid handle notch, wherein said middle of said divider defines a lid handle notch therein.

5. The object storage tray as defined in claim 1, further comprising:

a first sleeve support having opposing ends connecting said first telescoping sleeve to said first cross member;

a second sleeve support having opposing ends connecting said third telescoping sleeve to said second cross member, and a plurality of support members extending perpendicularly from said longitudinal member and a plurality of additional support members extending perpendicularly from said additional longitudinal member.

\* \* \* \* \*